United States Patent [19]

Golahny et al.

[11] 4,005,603
[45] Feb. 1, 1977

[54] APPARATUS FOR MEASURING FLUID FLOW

[75] Inventors: Yehuda Golahny, Newton, Mass.; Douglas A. Johns, Eden, N.Y.

[73] Assignee: Airco, Inc., Montvale, N.J.

[22] Filed: Sept. 3, 1975

[21] Appl. No.: 610,495

[52] U.S. Cl. ............................................ 73/194 M
[51] Int. Cl.² ......................................... G01F 1/86
[58] Field of Search ................... 73/194 M, 231 M

[56] References Cited

UNITED STATES PATENTS 3,566,685  3/1971  Zimmerman et al. ........... 73/194 M
3,839,911  10/1974  Zimmerman et al. ...... 73/231 M X

*Primary Examiner*—James J. Gill
*Attorney, Agent, or Firm*—David L. Rae; H. Hume Mathews; Edmund W. Bopp

[57] ABSTRACT

Apparatus for providing density compensation to measured volumes of fluid flow wherein means for sensing the fluid parameter having a dominant effect on the density thereof are adapted to produce an output signal which varies as a function of the magnitude of the sensed parameter. This output signal is supplied to a voltage-frequency converter which produces output pulses continually at a frequency corresponding to the magnitude of the output signal. The converter is gated to a coincidence gate for a period of predetermined duration upon detection of each unit change of volumetric fluid flow with the number of pulses accepted by the gate during such period reflecting the value of the dominant parameter and, hence density of the fluid. A frequency divider is configured to divide the gate output by a predetermined factor with each output pulse or count issued by the frequency divider representing a density corrected unit change of volumetric fluid flow. A display device is adapted to receive the output pulses or counts thereby enabling a visual display of the value of the density compensated volumetric fluid flow.

3 Claims, 2 Drawing Figures

APPARATUS FOR MEASURING FLUID FLOW

BACKGROUND OF THE INVENTION

This invention relates to apparatus for measuring fluid flow and more particularly to apparatus for providing a density compensation to measured fluid flow.

Various devices have been developed for enabling determination of volumetric fluid flows and in many instances, the particular fluid flow to be measured will not be altered appreciably under different ambient conditions. For example, water meters may be simply calibrated to measure fluid flow and subsequent recalibration is generally unnecessary as the density of water is hardly affected by the mere retention thereof under varying ambient temperatures. However, for numerous other fluids such as pressurized gases and cryogenic liquids, which must be retained or transported in appropriately pressurized or insulated vessels, fluid density will vary substantially as a consequence of unavoidable pressure and heat leaks attendant to such vessels. Such leaks will inevitably occur during the transport of a pressurized gas or cryogenic liquid from, for example, a production site to a point of end use. The term "pressurized" gas is generally defined as any gas retained under a pressure greater than atmospheric while the term "cryogenic" liquid refers to those substances existing in a liquid phase at temperatures below, for example, $-150°$ F. Exemplary of such cryogenic liquids is liquid nitrogen which is commonly introduced into transport vessels at a temperature of $77°$ K ($-320°$ F) and at atmospheric pressure. Alternately, the cryogenic liquid may comprise liquid oxygen or liquid argon. In addition, other materials such as liquid carbon dioxide, are also transported in pressurized containers. However, as heat leaks into such vessel are inevitable, the resulting temperature of the transported cryogenic liquid is inherently higher than the temperature at which such liquid was introduced into the vessel.

Generally, in the sale and distribution of industrial pressurized gases and cryogenic liquids, such materials are introduced into a transport vehicle such as a trailer at a production site. The amount of material introduced into such trailers is usually measured at standard temperature and pressure conditions, e.g. liquid nitrogen is generally supplied at a temperature of $77°$ K, 0 p.s.i.g., as noted above, and the mass or weight of such introduced material may be readily determined from a volumetric flow meter calibrated to such standard conditions. However, during transport liquid nitrogen may easily undergo a temperature increase from $77°$ to $90°$ K which typically results in a density reduction of approximately 8% although larger density reductions will be encountered for greater increases in temperatures. Consequently, the weight of each volumetric unit of liquid $N_2$ discharged from a trailer or the like will represent 92% of the weight of each volumetric unit, as measured by a volumetric flowmeter, introduced into the trailer. Therefore, by charging or billing a customer based on the volumetric flow of discharged liquid, the customer will be overcharged as a consequence of actually receiving a lower amount (weight) of liquid than would be indicated by an uncompensated volumetric reading of the discharged liquid flow. Similar changes in density and discrepancies between the introduced mass and discharged mass of pressurized gases will also occur as pressure leaks will contribute to a density reduction in each volume unit of the discharged gas. Thus, in the case of cryogenic liquid and pressurized gases, the density of which is sensitive to temperature and pressure leaks, respectively as aforesaid, changes in a parameter peculiar to such fluids will have significant effects on the density of such fluid upon discharge thereof after the fluid is subjected to such leaks. This parameter may be defined as the dominant parameter affecting the density of the particular fluid. In the case of pressurized gases this parameter is pressure and the dominant parameter affecting the density of cryogenic liquids is temperature.

One technique which has been proposed for solving the persistent problem of obtaining inaccurate volumetric flow measurements of discharged pressurized gases and cryogenic liquids is the recalibration of a volumetric flow meter immediately prior to the passage of a particular fluid therethrough. However, in practice such recalibration is time consuming and requires delicate adjustments, and as in many instances the operator of a storage facility or transport vehicle possesses limited skill in such areas, the concept of meter recalibration has not been proven effective in practice. Consequently, it is common practice for an operator to merely estimate the density of discharged fluid by applying a nominal correction factor to the actual reading appearing on a volumetric flowmeter of, for example, a cryogenic liquid trailer. Clearly, this technique fails to accurately provide density compensations to the measured volumetric fluid flow and thus fails to indicate with precision the actual amount or mass of fluid which should be charged or billed to a customer receiving the same. Therefore, it has been found that a clear need exists for obtaining simple and accurate density compensated measurements of pressurized gas and cryogenic liquid flows.

OBJECTS OF THE INVENTION

Accordingly, it is an object of the present invention to provide apparatus for accurately measuring a density corrected fluid flow.

It is a further object of the present invention to provide apparatus for effecting a density compensation to a measured fluid flow by sensing a parameter having a dominant effect on the fluid density and generating a density compensation in response to such sensed parameter.

It is a further object of the present invention to provide an apparatus for continuously displaying the value of a density compensated volumetric fluid flow.

It is yet another object of the present invention to provide a rugged and reliable apparatus suitable for use on pressurized gas or cryogenic liquid transport vehicles for effecting a density compensation of measured volumetric fluid flow discharged from such vehicle.

It is yet another object of the present invention to provide an apparatus for effecting density compensation to measured volumetric flows without requiring meter recalibration or calculations by an operator.

Other objects of the present invention will become apparent from the detailed description of an exemplary embodiment thereof which follows and the novel features of the present invention will be particularly pointed out in conjunction with the claims appended hereto.

SUMMARY

In accordance with the present invention, apparatus for supplying a density corrected or compensated value of volumetric fluid flow comprises means for sensing the dominant parameter affecting the density of said fluid; means for generating pulses at a frequency which varies as a function of the magnitude of said sensed parameter; fluid flow detecting means for producing a signal exhibiting a discrete transition in response to unit changes of volumetric fluid flow; means responsive to said signal for producing an envelope signal of predetermined duration commencing upon the occurrence of the discrete transition; means coupled to said pulse generating means, and to said means for producing said envelope signal, for accepting pulses generated in the period of predetermined duration and for producing output pulses corresponding to density compensated volumetric units of said fluid flow. Further in accordance with the invention the parameter which has a dominant effect upon the density of a fluid flow, such as pressure in the case of a pressurized gas or temperature in the case of a cryogenic liquid, is directly sensed and an electrical signal which varies directly or inversely, respectively, with such parameters is supplied to a voltage to frequency converter which is effective to generate pulses at a frequency corresponding to the magnitude of the input supplied thereto. Thus, the density correction to be applied to detected volumetric units of flow is generated directly from the parameter having the dominant effect on such density. For example, in order to provide a density compensated measurement of a cryogenic liquid flow, the actual temperature of the liquid is sensed and utilized to generate the required density correction as opposed to comparing an actual temperature measured with a reference or calibrated temperature and subsequently calculating a particular density correction factor.

The particular form of volumetric flowmeter contemplated by the present invention is not critical although such meter must be capable of providing an output signal which undergoes a discrete transition in response to the detection of each unit of volumetric flow therethrough (a pulse per unit volume). Thus, such a flowmeter may generate an output signal which will assume a high or low condition upon the measurement of a volumeteric unit of flow or, such a meter may genrate a sharp spike or pulse upon detection of the foregoing volumetric unit of flow. A timed envelope circuit is responsive to such discrete transitions for gating a coincidence gate to a condition in which such gate may accept, for a period of predetermined duration, pulses generated by the voltage-frequency converter. Preferably, the aforementioned period is a multiple of the nominal or reference period of pulses generated by the voltage-frequency converter. Consequently, the pulses collected in the coincidence gate are passed through a divider circuit with each output pulse issued therefrom representing a density corrected unit change of volumetric fluid flow. The output pulses are preferably supplied to a display device thereby providing a visual density compensated indication of the volumetric flow of fluid through the aforementioned flowmeter and hence enabling an accurate determination of the amount or mass of fluid actually discharged from a storage vessel or transport vehicle.

BRIEF DESCRIPTION OF THE DRAWING

The invention will be more clearly understood by reference to the following detailed description of an exemplary embodiment thereof in conjunction with the following drawing in which.

DESCRIPTION OF PREFERRED EMBODIMENTS

Figure 1:
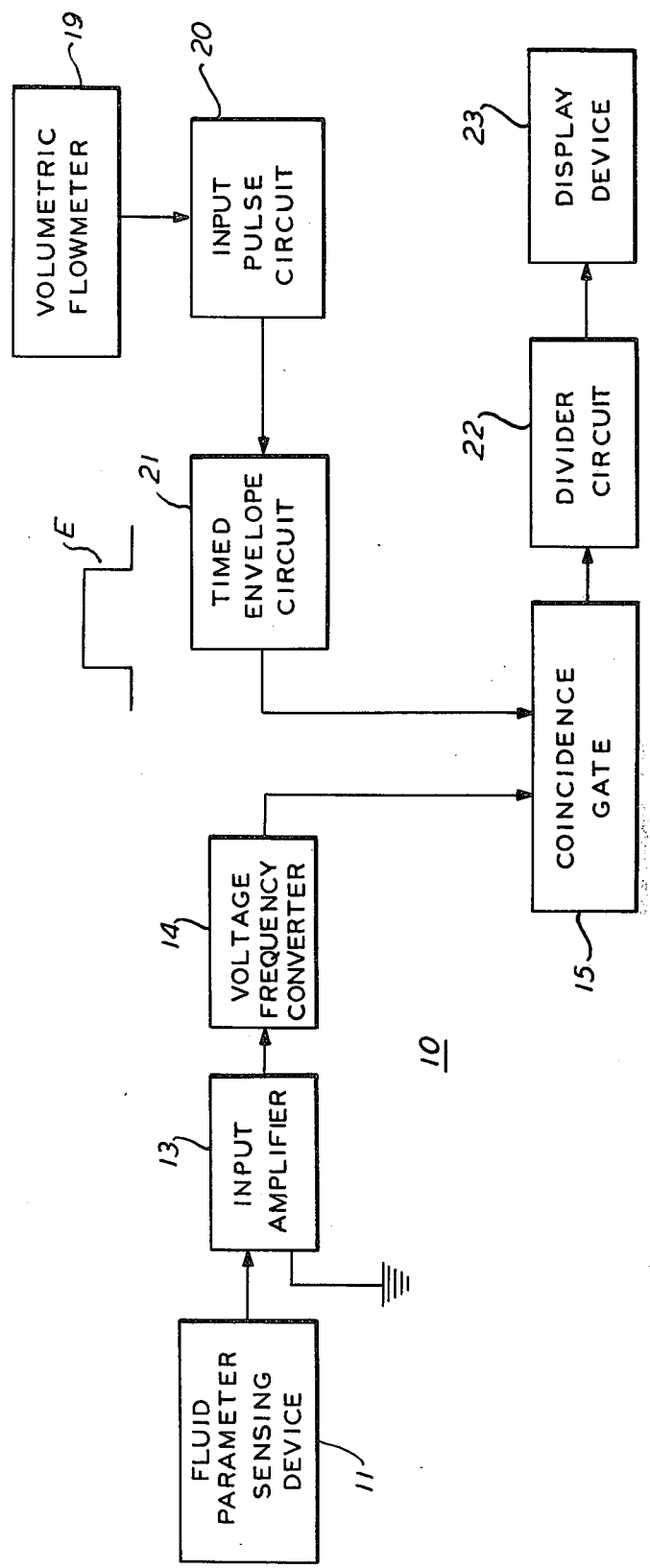
FIG. 1 is a diagrammatic view of an exemplary embodiment of apparatus for effecting a density compensation to volumetric unit of a fluid flow.

Referring now to FIG. 1, illustrated therein is an exemplary embodiment of apparatus for providing a density compensation to volumetric units of fluid flow and generally comprises a fluid temperature sensing device 11, input amplifier 13, voltage-frequency converter 14, coincidence gate 15, flowmeter 19, timed envelope circuit 21, divider 22 and display device 23. Fluid parameter sensing device 11 may take the form of a conventional device for measuring the parameter of a fluid having the dominant effect upon the density thereof. For example, in the course of providing density compensations to the volumetric flow of a pressurized gas, device 11 will take the form of a transducing device capable of providing an electrical signal which varies in magnitude in accordance with the pressure of such gas. Alternately, in instances wherein the fluid flow being measured comprises a cryogenic liquid, device 11 will constitute a temperature sensing element adapted to produce an output signal which varies inversely with the magnitude of the sensed temperature. Typically, such a temperature sensing device may comprise a silicon diode as will be described in greater detail hereafter. Input amplifier 13 preferably comprises a device adapted to receive an input voltage supplied thereto and increase the magnitude thereof by a desired gain. For example, amplifier 13 may be provided in integrated circuit form or as a known configuration of discrete circuit elements or a combination of both forms as will be described in connection with the exemplary circuitry illustrated in FIG. 2. Amplifier 13 is coupled to a voltage-frequency converter 14 which may comprise any conventional circuit adapted to produce an output signal having a frequency which varies in accordance with the magnitude of an applied input signal.

Volumetric flow meter 19 preferably comprises any known device adapted to produce an electrical output signal which exhibits discrete transitions corresponding to each unit change of fluid flow therethrough. for example, flow meter 19 may comprise a turbine or gear type meter wherein a plurality of turbine blades or gear elements are rotatably mounted within a conduit through which such fluid flows and in response to each volume unit change of fluid flow, such turbine blades or gear elements will be rotated and hence conditioned to effect a discrete transition in an electrical output signal. Although the foregoing forms of volumetric flowmeter 19 are suitable for use in connection with the density compensation apparatus according to the present invention, such flow meters are by nature somewhat inaccurate as a consequence of the necessity to provide appropriate sealing for shafts driven by the rotating elements. Consequently, the sealing is continually subjected to possible pressure and heat leaks thereby degrading the overall accuracy of such meters. Therefore, in accordance with the present invention, a volumetric flowmeter which avoids utilization of rotatably driven shafts or rods for generating the required discrete transitions in electrical output signals in response to each unit change of volumetric flow therethrough, is preferred. For example, such a meter may utilize a "vortex shedding" principle and is commercially available from Eastech, Inc. under Model No. VS-21. As those skilled in the art will appreciate, the latter meter uses a vortex shedding principle wherein upon a unit of fluid volume passing an apex, the fluid stream is stripped or shedded to form two paths around the apex. The two paths undergo a timing or phase shift which allows the two paths to rejoin downstream at 180° out of phase which creates a switching action. This switching action is thus effective to actuate an enclosed shuttle-type probe. Motion of this probe within a pre-established magnetic field induces an electrical current having a discrete transition as a consequence of probe motion rapidly changing the magnetic field. Consequently, a volumetric flowmeter utilizing a vortex shedding or other principle which avoids the aforementioned defects inherent to turbine and gear type meters and yet enables the production of discrete transitions in an output signal in response to each unit of volumetric fluid flow passing therethrough is suitable for the fluid density compensation apparatus according to the present invention. Input pulse circuit 20 may take the form of a conventional pre-amplifier for providing amplification and/or proper pulse shaping of the output of flowmeter 19 if required.

Timed envelope circuit 21 which is coupled to input pulse circuit 20 may take the form of any conventional circuit for producing a pulse of predetermined duration in response to receiving an input signal exhibiting a discrete transition. For example, circuit 21 may take the form of a conventional monostable multivibrator which as well knwon to those skilled in the art is effective to generate a pulse or timed envelope of predetermined duration E in response to a discrete transition of a pulse or spike applied as an input thereto. Gate 15, which may comprise a conventional coincidence gate device is supplied with the output signal of voltage-frequency converter 14 and timed envelope circuit 21. Thus, gate 15 is enabled to receive the output pulses of converter 14 only during the timed envelope or period E, i.e., when the output of timed envelope circuit 21 is in an up or high condition. The pulses accumulated within gate 15 are supplied to a divider circuit 22 which may comprise any known apparatus for supplying an output signal having a frequency which is a predetermined fraction of the frequency of the input signal supplied thereto.

Display device 23 may comprises a conventional electromechanical transducing device such as a mechanical counting arrangement wherein wheels having faces (not shown) exhibiting appropriate numerals are driven by a stepping motor or the like, or device 23 may comprises a decoding circuit and a typical LED display. Thus, display device 23 is effective to continually display the count of pulses supplied thereto from divider circuit 22 and hence provide a visual display of the density corrected volumetric fluid flow through flowmeter 19. Preferably, display device 23 is also provided with a conventional recording element such that a permanent graphical representation of the density compensated volumetric flow through flowmeter 19 may be provided.

In operation, in sensing the dominant parameter which affects the density of a fluid, such as the temperature of a cryogenic liquid, sensing device 11 is effective to supply an output signal which varies inversely with the sensed temperature of fluid passing through flowmeter 19. For a particular cryogenic liquid, sensing device 11 and amplifier 13 are calibrated to produce an output signal of predetermined magnitude in response to the sensing of a standard or reference temperature. Thus, in the course of measuring a liquid nitrogen flow, device 11 and amplifier 13 will provide an output of a predetermined magnitude in response to the sensing of th temperature of liquid nitrogen at a standard or reference value of 77° K. Consequently, the frequency of the output signal of voltage-frequency converter 14 will be established corresponding to the magnitude of the predetermined input supplied thereto and conveniently, a frequency of, for example, 100 kHz may be generated by converter 14 in response to the sensing by device 11 of a liquid nitrogen temperature of 77° K. As described heretofore, volumetric flowmeter 19 and input pulse circuit 20 will supply a signal exhibiting a discrete transition in response to the measurement of each unit change of volumetric fluid flow to timed envelope circuit 21. Accordingly, a pulse E having a predetermined duration which may, for example, be 1 ms. is supplied by circuit 21 to gate 15. Preferably, the predetermined duration of the timed envelope E is a multiple, e.g., 100, of the period of each pulse generated by converter 14 (0.01 ms.) upon device 11 sensing a reference temperature. However, in the event other frequencies are utilized, e.g. 120kHz, with a 1 ms. timed envelope, a frequency division of 120 will be effected as will be described hereafter. During the period of predetermined duration (E) in which gate 15 may accept pulses supplied by converter 14, 100 pulses will be passed through gate 15 to divider circuit 22 which effects a frequency division by a fixed factor of 100 (corresponding to the aforementioned multiple) and supplies a single output pulse or count to display device 23. Accordingly, as the flow of liquid cryogen is measured at the standard or reference temperature of 77° K, no density correction to the measured flow is necessary nor is such correction effected by apparatus illustrated in FIG. 1.

In the event that the temperature of the cryogenic liquid, such as liquid nitrogen, increases above the aforementioned reference temperature as a consequence of such fluid being retained in a storage or transport vessel and hence subject to heat leaks, the increased temperature thereof will be sensed by device 11 and a signal of correspondingly reduce magnitude is supplied through amplifier 13 to voltage-frequency converter 14. For example, in the event that the temperature of the measured flow of liquid nitrogen increases to 90° K, device 11 will produce an output signal having approximately 92% the magnitude of a similar signal generated in response to measuring a temperature of 77° K. Accordingly, upon sensing the former temperature, voltage-frequency converter 14 will be effective to supply an output signal at a frequency of approximately nine-tenths of the nominal or reference frequency, i.e. 92 kHz. Flowmeter 19, input pulse circuit 20 and timed envelope circuit 21 will operate as described heretofore and consequently, during each period of predetermined duration (E) established by envelope circuit 21, gate 15 will receive only 92 pulses. As divider circuit 22 is effective to provide a frequency division by a factor of 100, no output signal will be produced therefrom until 100 pulses have passed through gate 15. Thus, no output pulse or count will be supplied to display device 23 during the initially generated timed envelope E. However, upon volumetric flometer 19 producing a second output signal having a discrete transition representative of a second volumetric unit of fluid flow, a second envelope E will be generated by circuit 21 and consequently gate 15 will be enabled to receive pulses supplied by converter 14. Assuming that the temperature of the liquid nitrogen undergoing flow measurement remains constant, pulses will be supplied to gate 15 at a rate of 92 kHz and upon receipt of the 8th pulse during the second period established by timed envelope circuit 21, divider circuit 22 will produce an output signal or count as at this instant, a total of 100 pulses will have been supplied through gate 15 to divider circuit 22. This output signal is supplied to display device 23 which will indicate the value of the density compensated flow as the actual density of the liquid nitrogen undergoing flow measurement will be approximately 8% less than the density of such material at 77° K. Accordingly, a greater volume of liquid nitrogen is passed through flowmeter 19 before a density corrected unit volume is actually indicated by display device 23. Of course, the passage of a greater volume of liquid nitrogen at a lower density will nonetheless result in the actual discharge of a constant amount or mass of this material and thus, the volumetric indication of the amount of material so discharged is compensated for density variations as aforedescribed. Thus, the actual volumetric reading provided by display device 23 will be in accord with the actual mass of material passed through flowmeter 19. In this manner, both the supplier and customer will be apprised of the actual mass of material so distributed and hence, errors in the billing or charging of a customer for a particular volumetric flows will be substantially eliminated.

It will be appreciated that although liquid nitrogen has been described as exemplary of a cryogenic liquid and temperature of 77 and 90° K have been utilized as exemplary reference and actual temperatures thereof, the apparatus illustrated in FIG. 1 can similarly be used to provide density compensation through greater temperature ranges, for other cryogenic liquids at other temperatures, and for pressurized gases wherein the actual pressure of discharged gas is decreased due to pressure leaks inherent in a storage or transport vehicle. In the latter instance, sensing device 11 will constitute a pressure sensing device which produces an output signal that varies directly in accordance with measured pressures.

Figure 2:
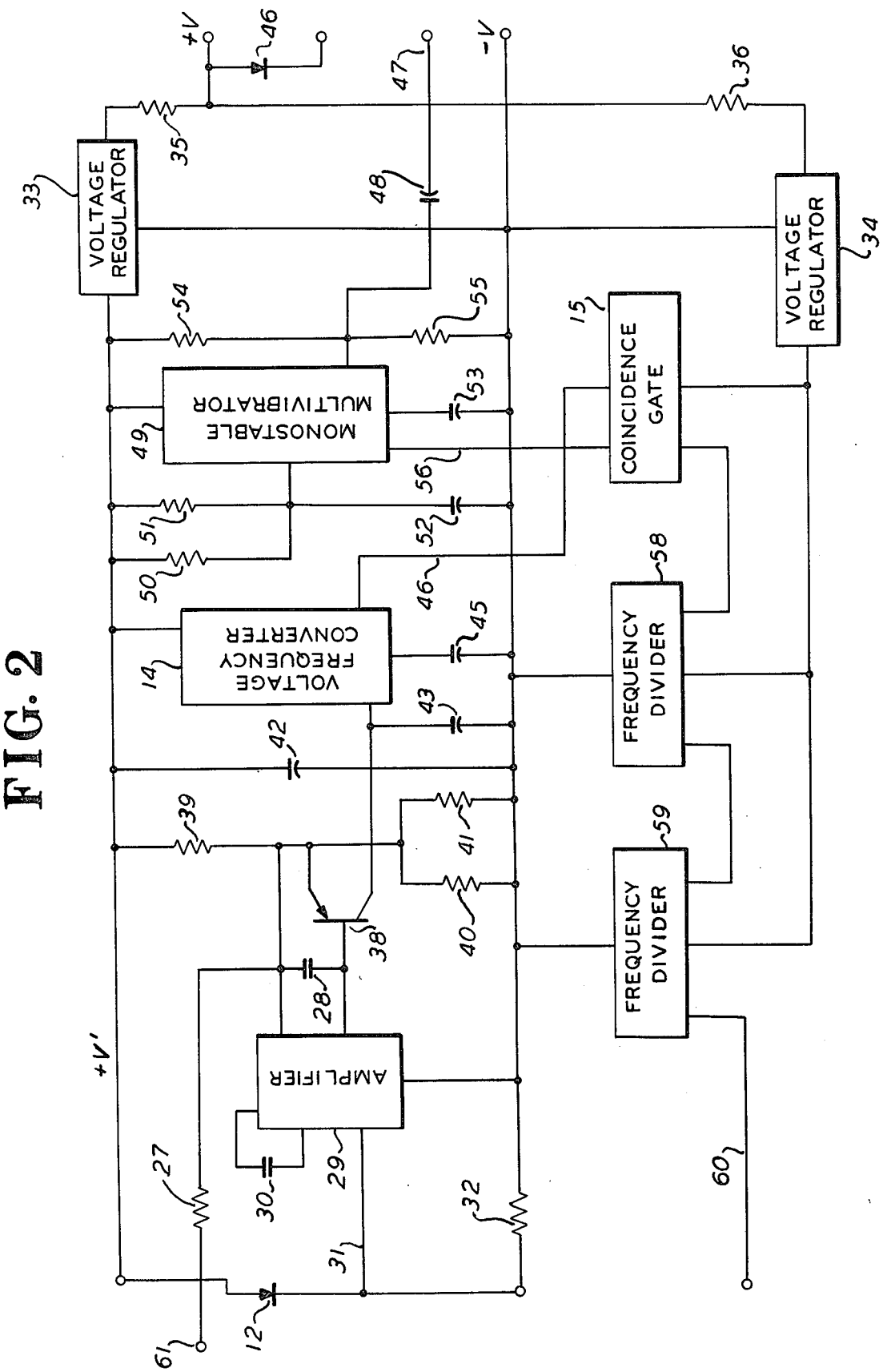
FIG. 2 is a partially schematic and partially diagrammatic view illustrating in greater detail the apparatus depicted in FIG. 1.

Referring now to FIG. 2, illustrated therein is an exemplary embodiment of an electrical circuit arranged to provide the necessary density correction to volumetric units of fluid flow. More particularly, the circuit illustrated in FIG. 2 includes voltage regulators 33 and 34 each of which is coupled through resistors 35 and 36, respectively, to a power source +V. An output of each voltage regulator 33 and 34 is connected to a negative potential —V which may comprise one terminal of a conventional 12 volt battery. A suitable diode 46 is provided to protect against polarity reversal of such a d.c. input potential. The regulated voltage appearing at line —V is supplied through a relatively high resistance 32 to sensing device 12 which may comprise a silicon diode adapted to produce an output at the anode thereof which varies inversely with respect to sensed temperatures. Alternatively, device 12 may comprise a pressure sensing device adapted to produce an output which varies directly with respect to pressures sensed thereby. The output of device 12 is supplied over line 31 as an input to amplifier 29 which may be an integrated circuit and, together with capacitors 28 and 30, is arranged as an operational amplifier adapted to supply an output signal of increased gain in known manner to the base electrode of transistor 38. A terminal 61 is coupled through an isolating resistor 27 to enable, if desired, the output of amplifier 29 to be supplied to a suitable readout device (not shown). In this manner, operation of the sensing device 12 may be monitored although this is not strictly necessary. A voltage dividing network comprised of resistor 39 connected in series with the parallel connection of resistors 40 and 41 between line V' (connected to an output of voltage regulator 33) and the negative supply —V. The emitter of transistor 38 is preferably coupled to the junction between resistor 39 and resistors 40, 41 as is an input to amplifier 29 which enables the application of an appropriate bias to the emitter electrode. Capacitor 42 is provided for circuit stability and filtering purposes.

The collector of transistor 38 is preferably connected to the input of voltage-frequency converter 14 and through capacitor 43 to the negative supply —V. This capacitor is utilized in conjunction with internal components of converter 14 for setting a standard or desired frequency in response to a predetermined input supplied thereto. In addition, converter 14 is coupled through capacitor 45 to the negative supply —V for the purpose of providing necessary stability to converter 14 with the output thereof supplied through conductor 46 to gate 15. Monostable multivibrator 49, which may comprise a conventional integrated circuit device for producing an output pulse of predetermined duration in response to an input thereto undergoing a discrete transition, is connected between the positive supply line V' and the negative supply —V. Preferably, capacitor 53 is provided to enable improved stability and noise compensation in the integrated circuit forming monostable 49. A timing network comprised of resistors 50 and 51 and capacitor 52 is connected between line V' and the negative supply —V with the junction between such resistors and capacitor 52 connected to monostable 49. As those skilled in the art will appreciate, by selecting appropriate values of resistors 50 and 51 and/or capacitor 52, the duration of the output pulse supplied by monostable 49 over conductor 56 may be accurately controlled. Conductor 47 is preferably connected to the input pulse circuit 20 (FIG. 1) to enable an input signal exhibiting a discrete transition in response to unit volumetric changes of fluid flow to be supplied through a d.c. blocking condenser 48 to monostable 49. Preferably, balancing resistances 54 and 55 are provided to enhance the operation of monostable 49 in a known manner.

Gate 15 is adapted to receive the output of converter 14 supplied through conductor 46 and the output of monostable 49 through conductor 56. As mentioned previously, gate 15 will only be enabled to receive pulses supplied by converter 14 upon the output of monostable 49 assuming an up or high condition for a period of predetermined duration which may, for example, be 1 ms. Voltage regulator 34 is preferably coupled to gate 15 to supply a substantially constant input potential thereto. The output of gate 15 is connected to the input of a frequency divider 58, the output of which is subsequently supplied as an input to frequency divider 59. Each of dividers 58 and 59 may take the form of conventional shift registers and effectively constitute a "divide by 10" circuit. Thus, upon the supply of 10 input pulses by gate 15 to divider 58, a single pulse will be supplied to divider 59 and divider 58 will be reset to a condition wherein a further 10 pulses may be supplied thereto before a second output pulse is supplied to divider 59. Consequently, until 10 pulses have been received by divider 59, no output will be supplied over conductor 60 and hence, frequency dividers 58 and 59 constitute a circuit for dividing the frequency of signals supplied by gate 15 by a factor of 100. In addition, frequency dividers 58 and 59 are supplied by the output voltage of regulator 34 and are coupled to the regulated negative supply −V.

Operation of the circuit illustrated in FIG. 2 will now be described. Upon the application of supply voltages ±V, sensing device 12 will be supplied with a substantially constant current and will produce output voltage on conductor 31 which will vary inversely with sensed temperatures. This output voltage is amplified by amplifier 29 and transistor 38 and is supplied as an input to voltge-frequency converter 14. The output of converter 14 will constitute a signal having a frequency which varies in accordance with the magnitude of the input voltage supplied thereto and is supplied through conductor 46 to gate 15. The output of flow meter 19 and input pulse circuit 20 (FIG. 1) which exhibits discrete transitions in response to the detection of unit volumetric changes of fluid flow is supplied through conductor 47, capacitor 48 to monostable 49 thereby causing the latter to supply a pulse of predetermined duration over conductor 56 to gate 15 thereby enabling gate 15 to accept, for the duration of such pulse, the output of converter 14. Accordingly, the number of pulses received or accepted by gate 15 in such period of predetermined duration will vary inversely with respect to the sensed temperature of the fluid flow but directly with respect to the density of such fluid. Thus, a decreased fluid density will be reflected by a lower number of pulses being accepted by gate 15 during the predetermined period of pulse acceptance established by monostable 49. Consequently, by supplying the accepted pulses through a pair of frequency dividers, an output count or pulse will be supplied through conductor 60 to display device 23 (FIG. 1) as previously described in connection with the operation of the apparatus illustrated therein. Consequently, the actual or uncorrected unit volumetric changes of fluid flow detected by flowmeter 19 are corrected or compensated for the actual density of such fluid flow undergoing measurement by directly sensing the fluid parameter having a dominant effect on fluid density and consequently, the volumetric fluid flow displayed by device 23 will be representative of the actual mass or weight of material so measured. Therefore, a cryogenic liquid flow actually measured is corrected for density variations from a predetermined or reference density as a consequence of detecting the actual temperature of the fluid flow. Thus, a density compensated volumetric indication of the fluid flow is obtained thereby enabling a more accurate billing or charging of the price of such measured fluid flow to a customer.

While the present invention has been particularly described in terms of a specific embodiment thereof, it will be understood that numerous variations upon the invention are now enabled to those skilled in the art, which variations are again within the instant teaching. Accordingly, the present invention is to be broadly construed and limited only by the scope and spirit of the claims now appended hereto.

What is claimed is:

1. Apparatus for producing a density corrected measurement of the volumetric flow of a cryogenic liquid, the density of which varies inversely with respect to the temperature thereof comprising temperature sensing means adapted to be disposed in said cryogenic liquid; means for supplying a substantially constant energizing current to said temperature sensing means to develop thereacross a voltage having a magnitude which varies inversely with respect to the temperature of said cryogenic liquid; means coupled to said temperature sensing means for generating pulses at a frequency which varies directly with respect to the magnitude of said voltage; fluid flow detecting means for producing a signal which exhibits a discrete transition in response to each unit of volumetric flow of said cryogenic liquid; means responsive to said signal for producing an envelope signal of predetermined duration commencing upon the occurrence of said discrete transition, said duration being a predetermined multiple of the period of said generated pulses which period corresponds to a reference temperature of said cryogenic liquid; coincidence means coupled to said pulse generating means and to said means for producing an envelope signal for passing said generated pulses only for the duration of said envelope signal; frequency divider means coupled to the output of said coincidence means for dividing the frequency of said generated pulses passed by said coincidence means by said multiple regardless of the actual frequency of said pulses such that whenever the number of generated pulses passed to said frequency divider means equals said multiple, an output pulse corresponding to one density corrected unit of volumetric flow of said cryogenic liquid is produced; and means for displaying said output pulses whereby a visual display of the value of said density corrected volumetric flow of said cryogenic liquid is enabled.

2. Apparatus as defined in claim 1 wherein said means for producing said envelope signal comprise a monostable multivibrator.

3. A method for producing a density corrected measurement of the volumetric flow of a cryogenic liquid, the density of which varies inversely with respect to the temperature thereof comprising disposing a temperature sensing device in said cryogenic liquid to sense the temperature thereof; supplying a substantially constant energizing current to said temperature sensing device to develop thereacross a voltage having a magnitude which varies inversely with respect to the temperaturre of said cryogenic liquid; generating pulses at a frequency which varies directly with respect to the magnitude of said voltage; producing a signal which exhibits a discrete transition in response to each unit of volumetric flow of said cryogenic liquid; producing an envelope signal of predetermined duration commencing upon the occurrence of said discrete transition with said duration being a predetermined multiple of the period of said pulses which period corresponds to a reference temperature of said cryogenic liquid; supplying said generated pulses and said envelope signal to a coincidence device for passing said generated pulses only for the duration of said envelope signal; dividing the frequency of said pulses passed by said coincidence device by said multiple regardless of the actual frequency of said pulses to produce an output pulse corresponding to each density corrected unit of volumetric flow of said cryogenic liquid; and displaying the the total of said output pulses whereby a visual display of the value of said density corrected volumetric flow of said cryogenic liquid is enabled.

* * * * *